United States Patent
Warkentin

[11] Patent Number: 5,331,806
[45] Date of Patent: Jul. 26, 1994

[54] HYDROGEN FUELLED GAS TURBINE

[76] Inventor: Daniel A. Warkentin, #94 Gilbert Crescent, Red Deer, Alberta, Canada, T4P 3L5

[21] Appl. No.: 114,741

[22] Filed: Aug. 30, 1993

[30] Foreign Application Priority Data

Feb. 5, 1993 [CA] Canada ................................ 2088947

[51] Int. Cl.$^5$ ............................. F02C 3/22; F02C 3/30
[52] U.S. Cl. ............................... 60/39.465; 60/39.52; 60/39.53
[58] Field of Search ............. 60/39.465, 39.182, 39.52, 60/39.53, 728

[56] References Cited

U.S. PATENT DOCUMENTS

| | | | |
|---|---|---|---|
| 2,407,165 | 9/1946 | Kreitner et al. | 60/39.53 |
| 2,965,402 | 10/1960 | Rae | 60/39.465 |
| 3,866,411 | 2/1975 | Marion et al. | 60/39.182 |
| 4,148,185 | 4/1979 | Somers | 60/39.465 |
| 4,418,527 | 12/1983 | Schlom et al. | 60/39.53 |
| 4,426,018 | 1/1984 | Collet | 60/728 |
| 4,434,613 | 3/1984 | Stahl | 60/39.52 |
| 4,448,018 | 5/1984 | Sayama et al. | 60/39.53 |
| 5,177,952 | 1/1993 | Stone | 60/39.465 |
| 5,181,376 | 1/1993 | Rao | 60/39.182 |

FOREIGN PATENT DOCUMENTS

| | | |
|---|---|---|
| 0163335 | 12/1985 | European Pat. Off. . |
| 2405219 | 8/1975 | Fed. Rep. of Germany . |
| 2615122 | 10/1977 | Fed. Rep. of Germany . |
| 3248440 | 7/1983 | Fed. Rep. of Germany . |
| 0073827 | 5/1982 | Japan ............... 60/39.52 |

OTHER PUBLICATIONS

Popular Science-Feb. 1992 p. 57.

*Primary Examiner*—Richard A. Bertsch
*Assistant Examiner*—Timothy S. Thorpe
*Attorney, Agent, or Firm*—Davis, Bujold & Streck

[57] ABSTRACT

A hydrogen fuelled gas turbine which includes a combustion chamber having a steam inlet, an oxygen inlet, a hydrogen inlet, and an outlet. A compressor is provided. The steam inlet is connected to the compressor such that the compressor provides steam as a working fluid. The hydrogen inlet is connected to a source of hydrogen gas, whereby hydrogen gas serves as a fuel for combustion. The oxygen inlet is connected to a source of oxygen gas, whereby oxygen is supplied to oxidize the hydrogen fuel. An igniter is disposed within the combustion chamber whereby the hydrogen/oxygen mixture is explosively ignited. The products of combustion combine with the steam and rapidly expand out through the outlet of the combustion chamber. A turbine is provided having an inlet, an outlet and a rotatable member disposed in a flow path between the inlet and the outlet. The inlet of the turbine is connected to the outlet of the combustion cheer such that expanding products of combustion and steam exert a force to rotate the rotatable member when passing from the inlet to the outlet. The compressor has an inlet coupled with the outlet of the turbine whereby steam from the outlet of the turbine is recycled. The compressor has a plurality of water injectors adapted for connection to a water source whereby water is injected into the steam such that the water draws heat from the steam as it vaporizes thereby triggering a physical volume reduction.

10 Claims, 10 Drawing Sheets

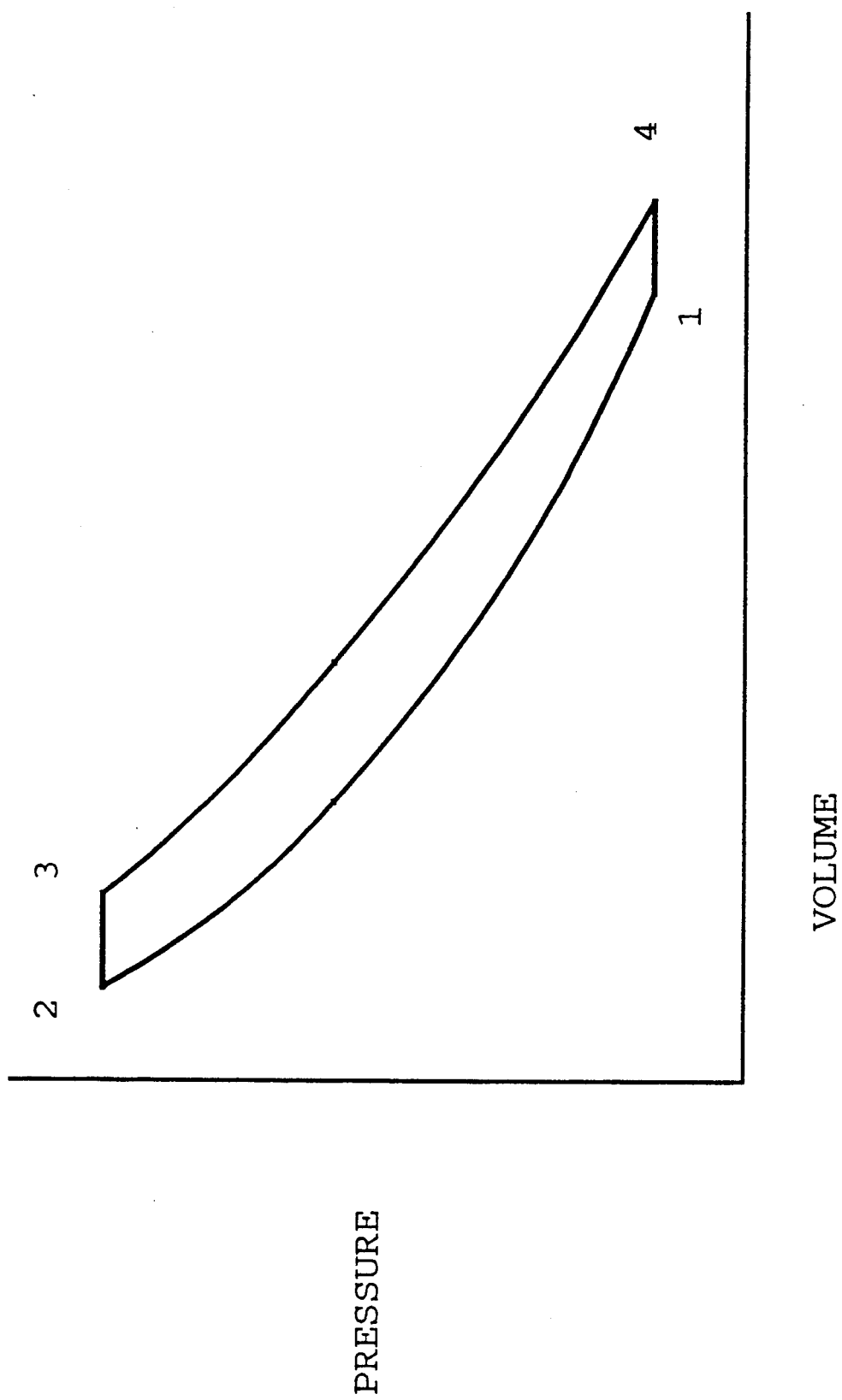

HYDROGEN FUELLED GAS TURBINE

The present invention relates to a hydrogen fuelled gas turbine.

BACKGROUND OF THE INVENTION

Hydrocarbon fuelled gas turbines have two drawbacks. Firstly, they are inefficient and secondly, they produce an unacceptable level of noxious emissions. Hydrogen fuelled gas turbines are replacing hydrocarbon fuelled gas turbines, in order to reduce noxious emissions. However, the replacing of hydrocarbon fuelled gas turbines with hydrogen fuelled gas turbines does not address the issue of the overall efficiency of the gas turbine. A continuous stream of heat and water vapour is exhausted from hydrogen fuelled gas turbines, together with nitrogen oxide emissions. The nitrogen oxide emissions are a byproduct of the air used as a source of oxygen for combustion.

SUMMARY OF THE INVENTION

What is required is a hydrogen fuelled gas turbine which is more efficient and has fewer noxious emissions.

According to the present invention there is provided a hydrogen fuelled gas turbine which includes a combustion chamber having a steam inlet, an oxygen inlet, a hydrogen inlet, and an outlet. A compressor is provided. Means is provided for connecting the steam inlet to the compressor such that the compressor provides steam as a working fluid. Means is provided for connecting the hydrogen inlet to a source of hydrogen gas, whereby hydrogen gas serves as a fuel for combustion. Means is provided for connecting the oxygen inlet to a source of oxygen gas, whereby oxygen is supplied to oxidize the hydrogen fuel. An igniter is disposed within the combustion chamber whereby the hydrogen/oxygen mixture is explosively ignited. The products of combustion combine with the steam and rapidly expand out through the outlet of the combustion chamber. A turbine is provided having an inlet, an outlet and a rotatable member disposed in a flow path between the inlet and the outlet. The inlet of the turbine is connected to the outlet of the combustion chamber such that expanding products of combustion and steam exert a force to rotate the rotatable member when passing from the inlet to the outlet. The compressor has an inlet which is coupled with the outlet of the turbine whereby steam from the outlet of the turbine is recycled. The compressor has a plurality of water injectors adapted for connection to a water source whereby water is injected into the steam such that the water draws heat from the steam as it vaporizes thereby triggering a physical volume reduction.

The hydrogen fuelled gas turbine, as described, has an improved thermodynamic heat cycle; including means for increasing the efficiency of the gas turbine by continuously recycling the steam. Heat and steam exhausted in prior art turbines is recycled. Separate sources of hydrogen and oxygen are used; the hydrogen as fuel and the oxygen for combustion. The use of oxygen and hydrogen, instead of air, eliminate nitrogen oxide emissions present with other hydrogen fuelled gas turbines. The hydrogen and oxygen together with the products of combustion resulting from oxidization of the hydrogen are compatible with the steam. Were it not for the injection of water into the compressor, the recycling of steam would present technical difficulties. It would take an unacceptable input of energy to compress steam for the purpose of recycling. However, the injection of water draws heat from the steam. As heat is drawn from the steam a physical volume reduction occurs. This physical volume reduction is a radical contraction which turns an otherwise energy intensive procedure into one which theoretically is capable of producing work if the compressor is coupled to the turbine. The compression can be termed "polytropic", as opposed to "isentropic".

Although beneficial results may be obtained through the use of the hydrogen fuelled gas turbine, as described, water injected into the compressor must be pure water having no suspended or dissolved solids; condensed steam is an excellent source of pure water. Even more beneficial results may, therefore, be obtained by having a secondary steam recycling path passing through a condenser and terminating in a vented water storage tank. The steam being recycled is induced to condense in the condenser to form water which flows to the water storage tank. Water in the water storage tank can be used as a source of pure water, including serving as the water source for the water injectors. In addition, a heat exchange occurs within the condenser during the process of condensing the steam. The heat exchanged can potentially be captured and used for a useful purpose.

Although there are a number of types of compressors suitable for use in the described hydrogen fuelled gas turbine, it is preferred that an axial flow compressor is used, as this compressor is comparatively more efficient and best suited to handle injection of water.

Although beneficial results may be obtained through the use of the hydrogen fuelled gas turbine, as described, by adding means to continually replenish the hydrogen and oxygen consumed it is possible to create a "closed" system. Such a closed system would be extremely useful in remote locations. Even more beneficial results may, therefore, be obtained when the source of hydrogen and the source of oxygen is an electrolyzer. The electrolyzer is coupled to the water storage tank such that water from the water storage tank is passed through the electrolyzer and broken down into its constituent elements of hydrogen and oxygen.

BRIEF DESCRIPTION OF THE DRAWINGS

These and other features of the invention will become more apparent from the following description in which reference is made to the appended drawings, wherein:

FIG. 10 is a diagram of an ideal thermodynamic cycle according to the teachings of the present invention.

DETAILED DESCRIPTION OF THE PREFERRED EMBODIMENT

Figure 1:
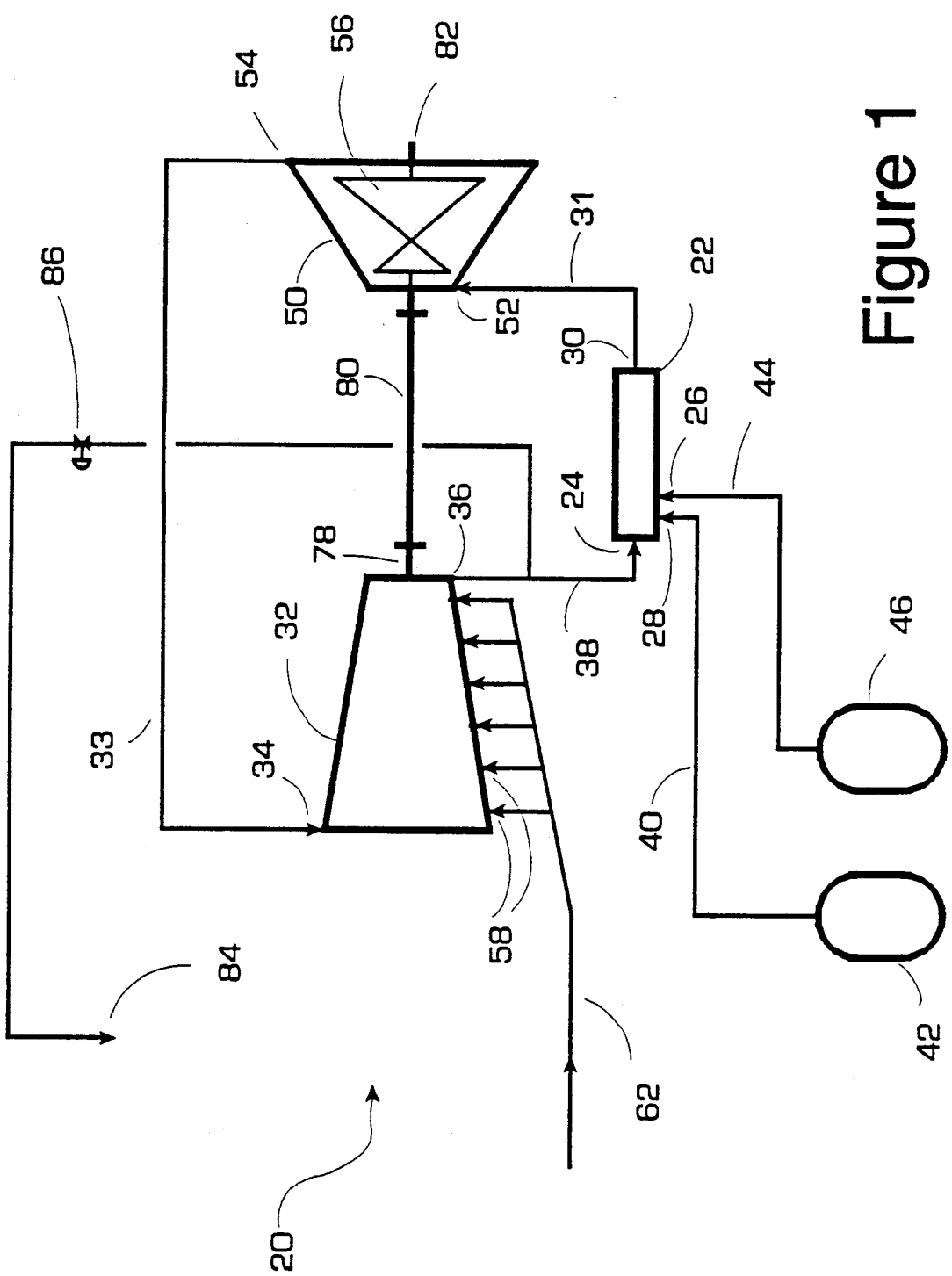
FIG. 1 is a diagram illustrating a first embodiment of a hydrogen fuelled gas turbine constructed in accordance with the teachings of the present invention.

The preferred embodiment, a hydrogen fuelled gas turbine generally identified by reference numeral 20, will now be described with reference to FIGS. 1 through 11.

Figure 2:
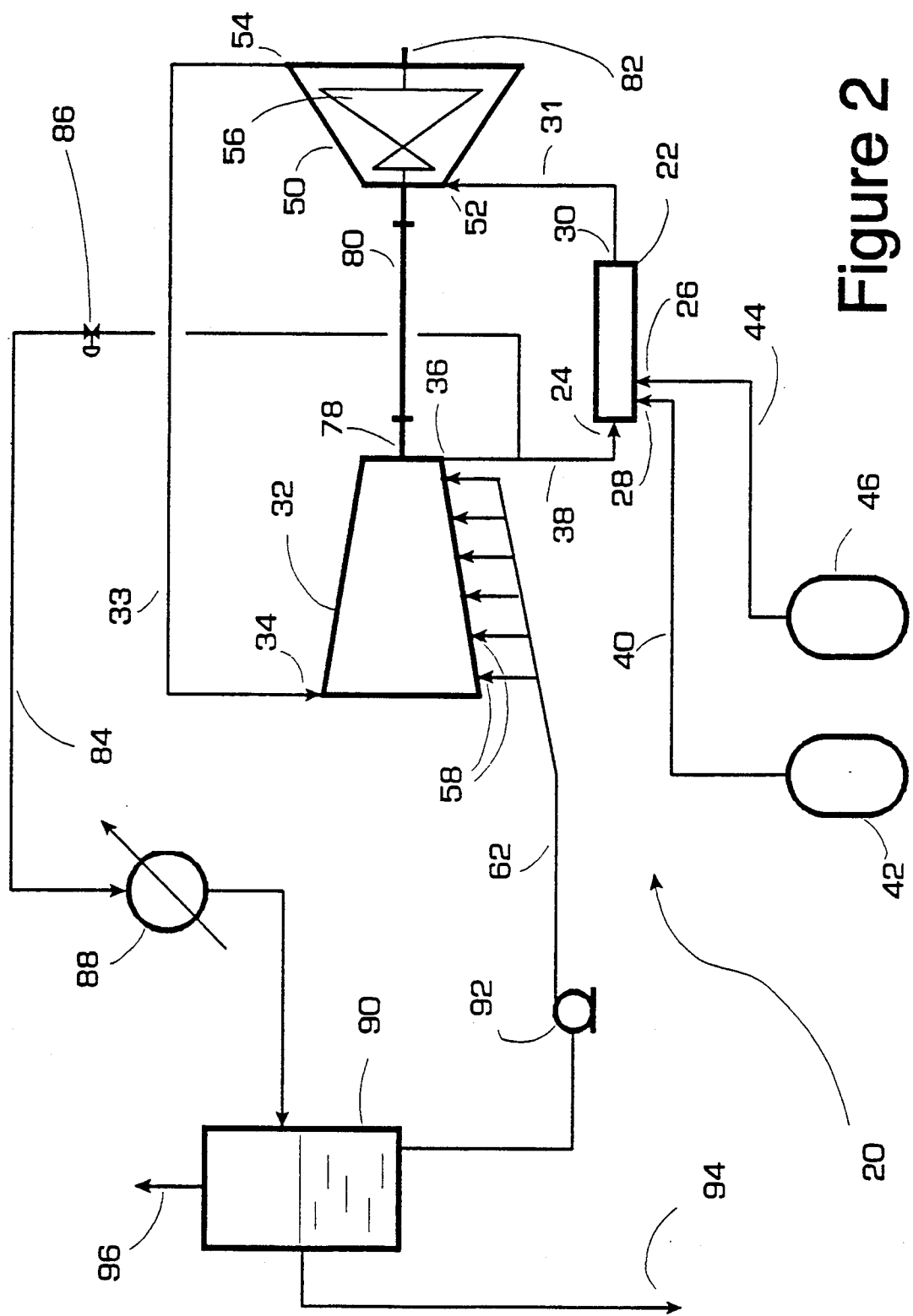
FIG. 2 is a diagram illustrating a second embodiment of a hydrogen fuelled gas turbine constructed in accordance with the teachings of the present invention.
Figure 3:
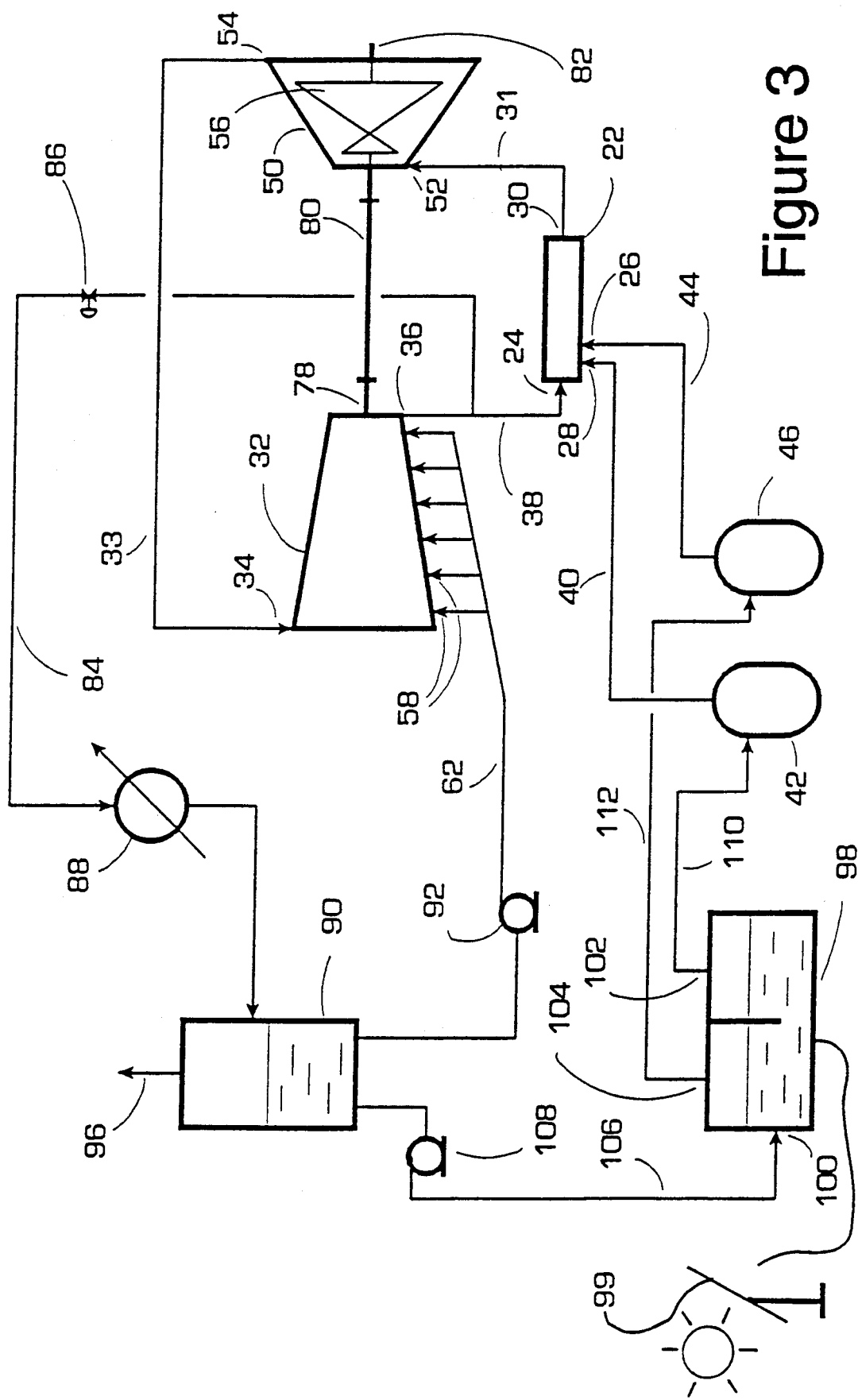
FIG. 3 is a diagram illustrating a third embodiment of a hydrogen fuelled gas turbine constructed in accordance with the teachings of the present invention.
Figure 4:
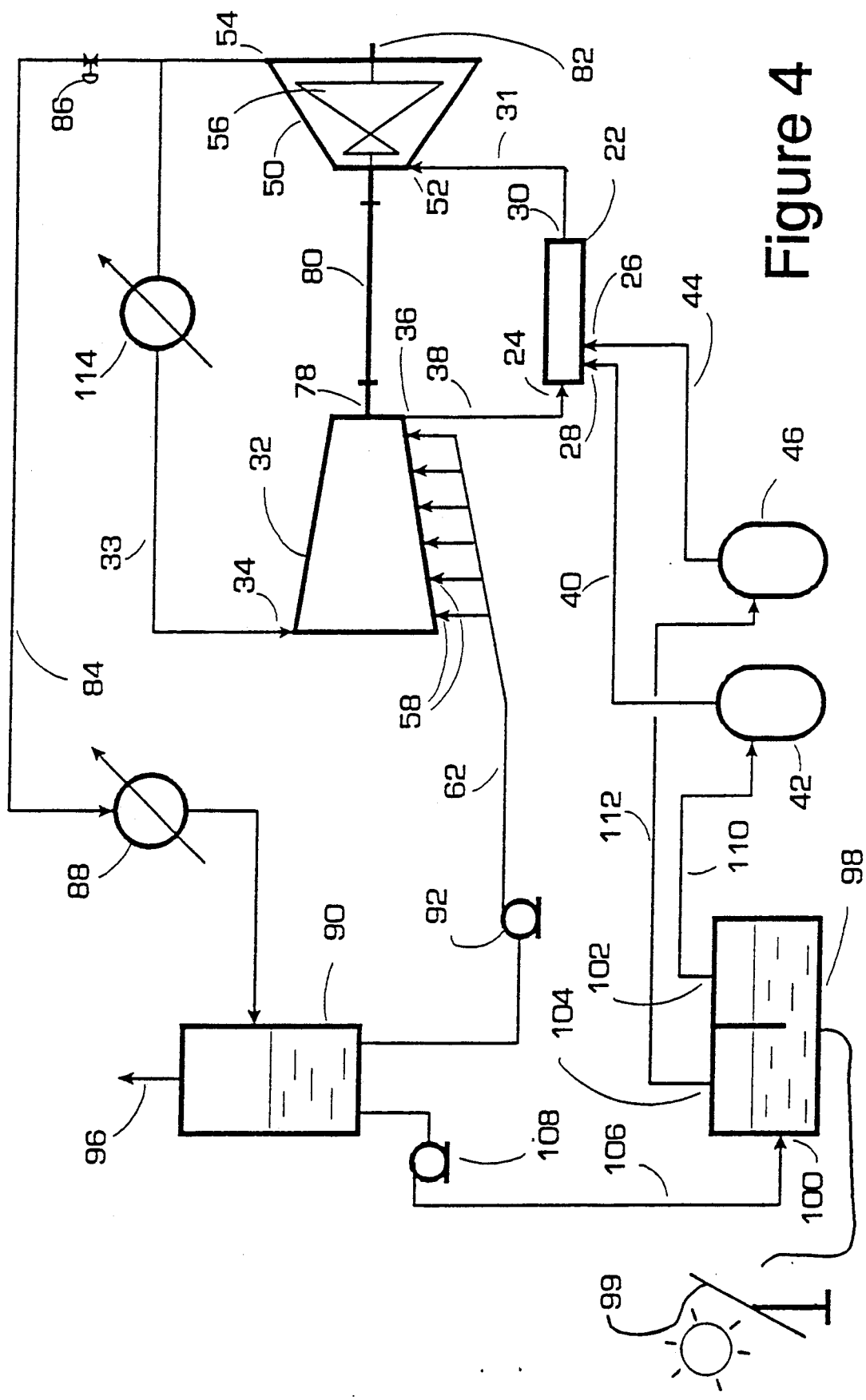
FIG. 4 is a diagram illustrating a fourth embodiment of a hydrogen fuelled gas turbine constructed in accordance with the teachings of the present invention.

Four alternate embodiments of hydrogen fuelled gas turbine are illustrated in FIGS. 1 through 4. The hydrogen fuelled gas turbine illustrated in FIG. 1 is a basic configuration, additional features have been added to each successive hydrogen fuelled gas turbine as illustrated in FIGS. 2 through 4.

Figure 5:
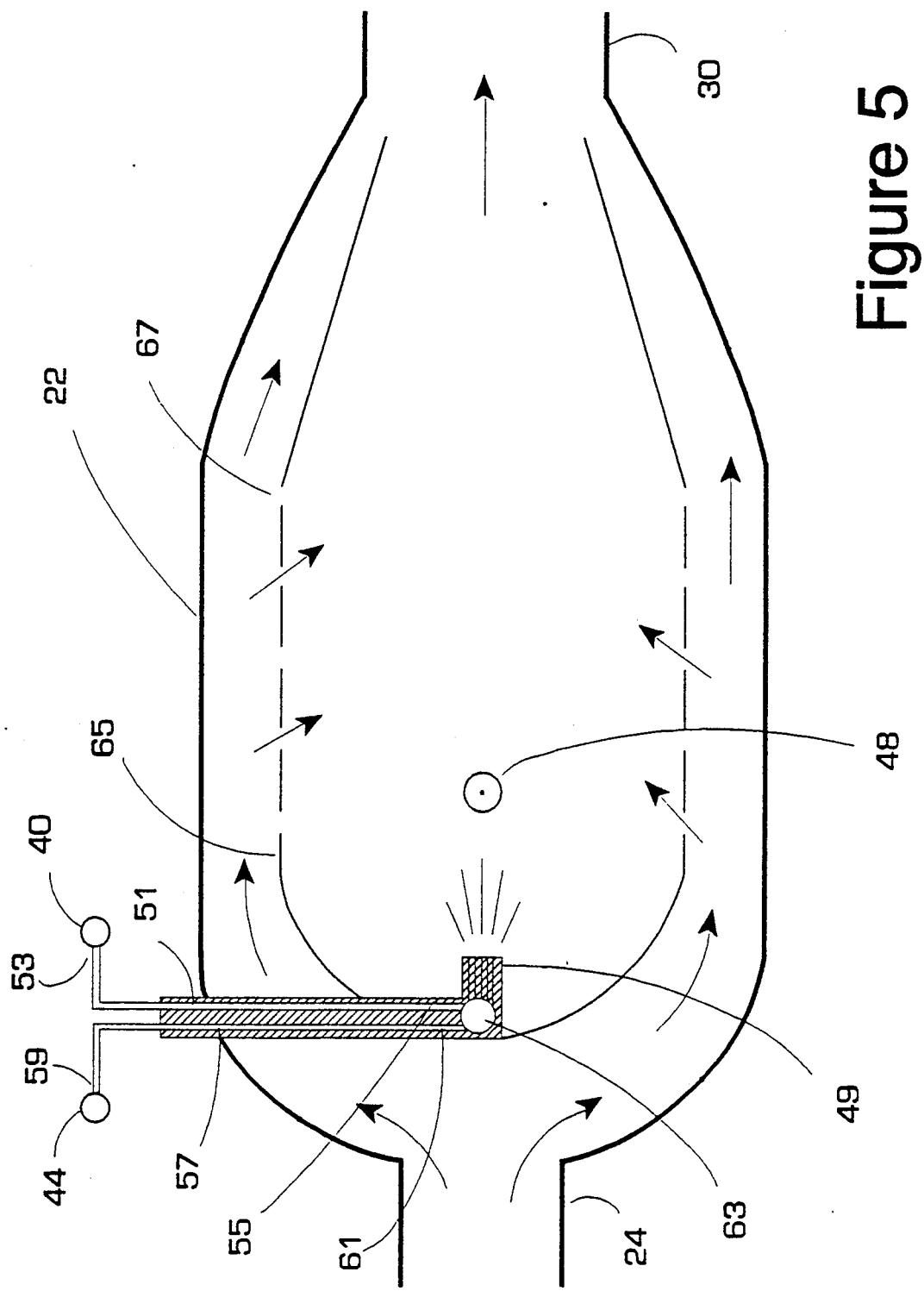
FIG. 5 is a side elevation view in longitudinal section, illustrating combustion chamber detail of the hydrogen fuelled gas turbines illustrated in FIGS. 1 through 4.
Figure 7:
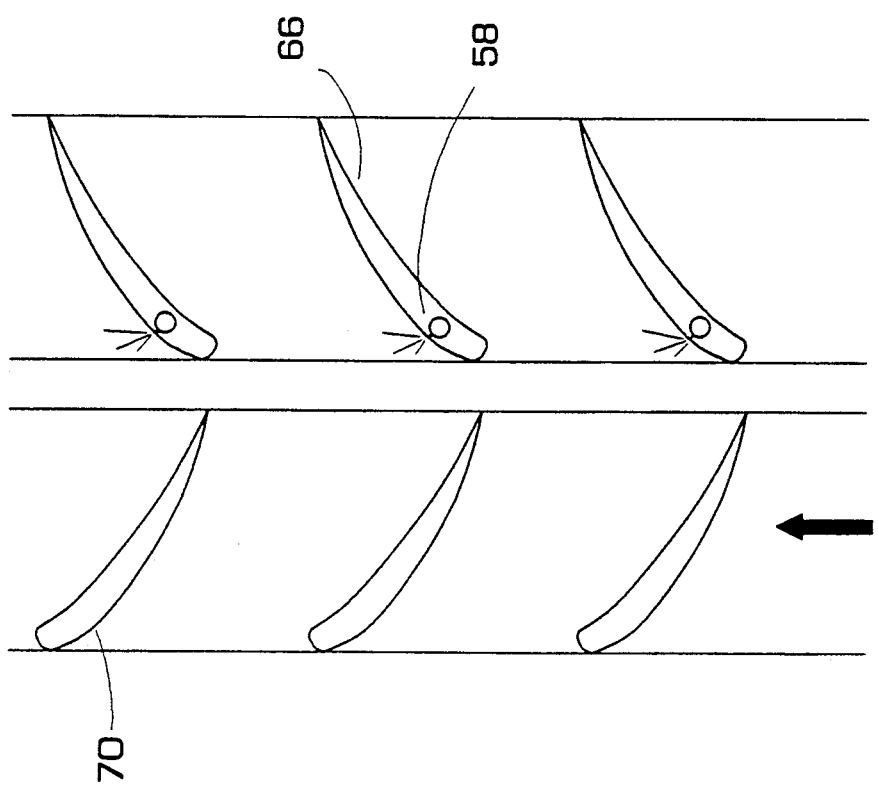
FIG. 7 is a top plan view in longitudinal section, illustrating alternate compressor detail of the hydrogen fuelled gas turbines illustrated in FIGS. 1 through 4.
Figure 6:
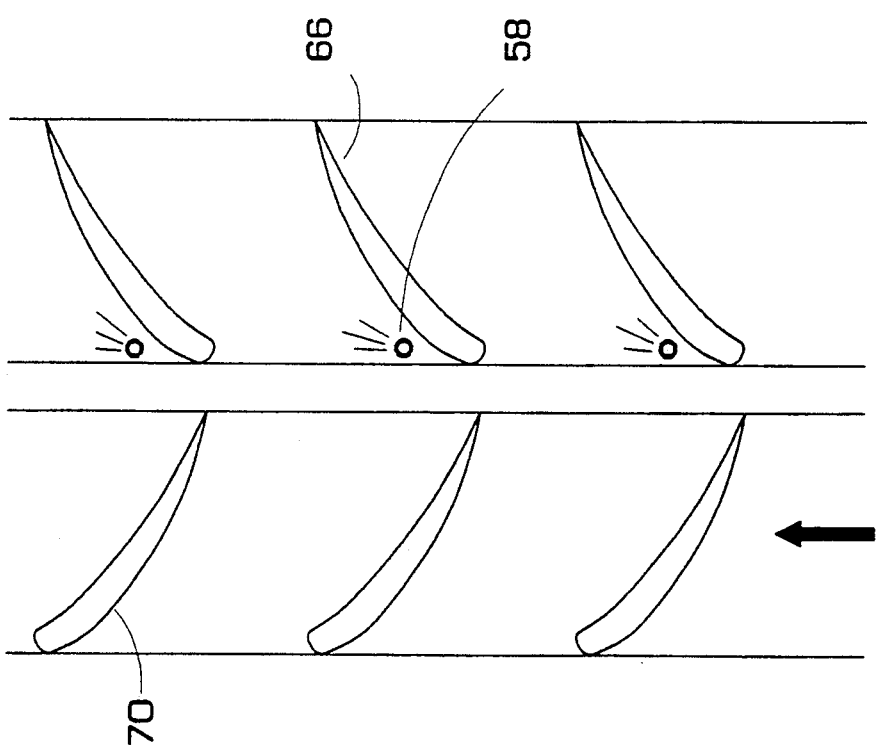
FIG. 6 is a top plan view in longitudinal section, illustrating compressor detail of the hydrogen fuelled gas turbines illustrated in FIGS. 1 through 4.
Figure 9:
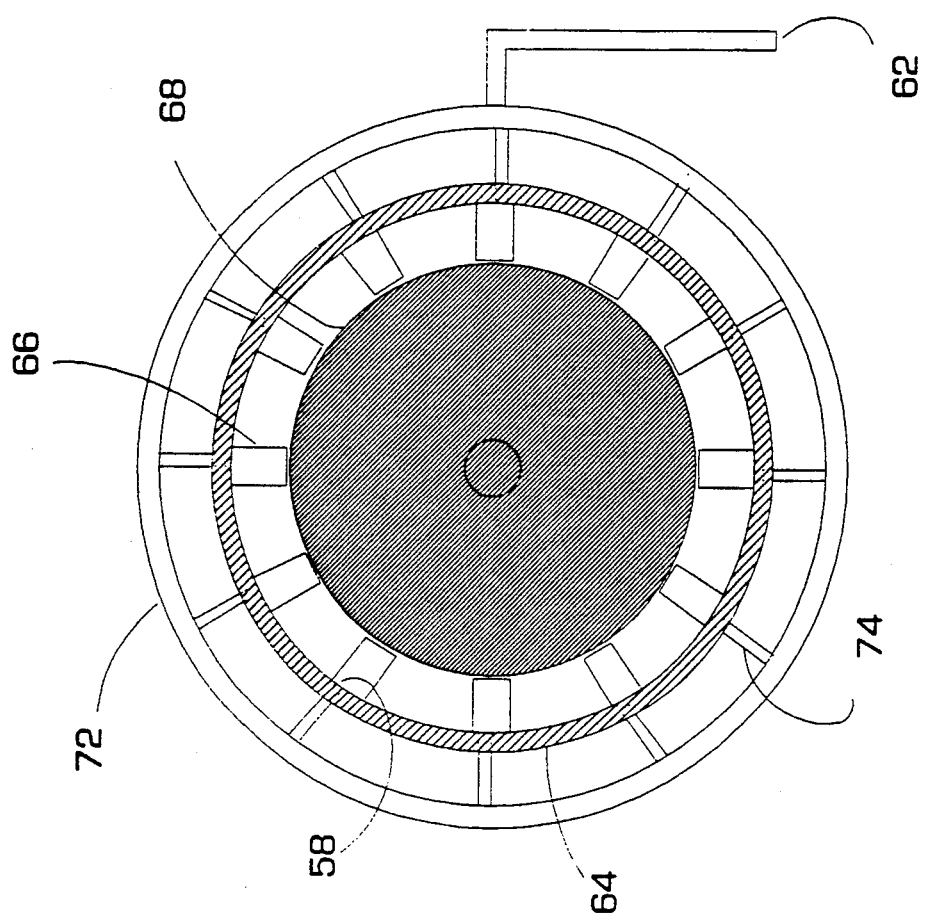
FIG. 9 is a cross section taken along section lines 9—9 of FIG. 8.
Figure 8:
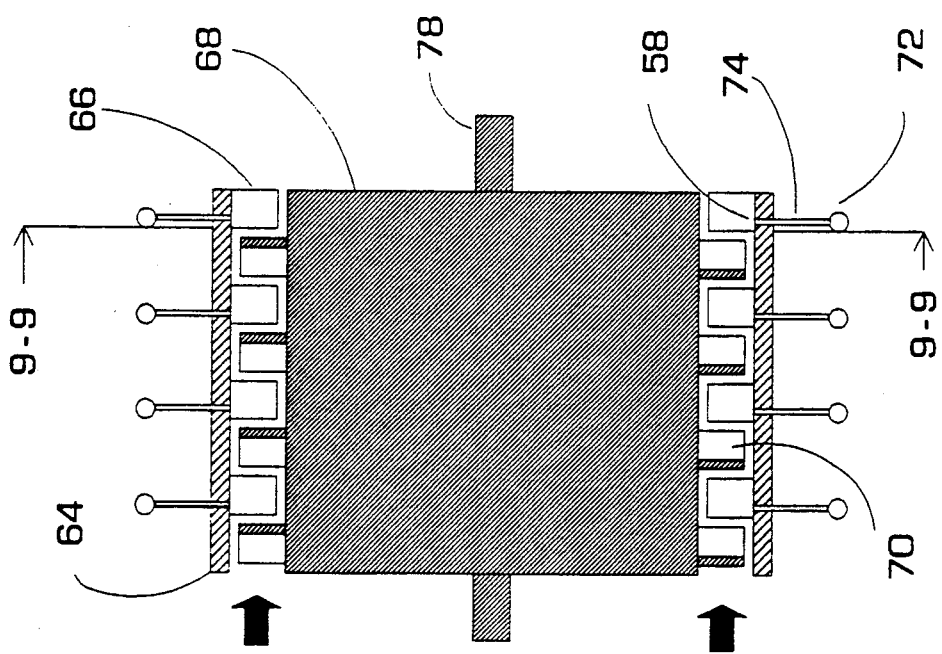
FIG. 8 is a side elevation view in longitudinal section, illustrating the water spray nozzle injection assembly in the compressor illustrated in FIGS. 1 through 4.

Referring to FIG. 1, hydrogen fuelled gas turbine 20 includes a combustion chamber 22 having a steam inlet 24, an oxygen inlet 26, a hydrogen inlet 28, and an outlet 30. A compressor 32 is provided having an inlet 34 and an outlet 36. A conduit 38 connects steam inlet 24 of combustion chamber 22 to outlet 36 of compressor 32. Compressor 32 provides steam as a working fluid as will be hereinafter further described. Conduit 40 connects hydrogen inlet 28 to a source of hydrogen gas, such as hydrogen storage tank 42. Hydrogen gas serves as a fuel for combustion as will hereinafter be further described. Conduit 44 connects oxygen inlet 26 to a source of oxygen, such as oxygen storage tank 46. Oxygen is supplied to oxidize the hydrogen fuel in the combustion process as will be hereinafter further described. Referring to FIG. 5, an igniter 48 and a fuel nozzle 49 are disposed within combustion chamber 22. Fuel nozzle 49 has a hydrogen passage 51 having a first end 53 and a second end 55, and an oxygen passage 57 having a first end 59 and a second end 61. First end 53 of hydrogen passage 51 is connected to conduit 40 which supplies hydrogen from hydrogen storage tank 42. First end 59 of oxygen passage 57 is connected to conduit 44 which supplies oxygen from oxygen storage tank 46. Second end 55 of hydrogen passage 51 and second end 61 of oxygen passage 57 both terminate in a common mixing chamber 63. Combustion chamber 22 has an inner housing 65 having a plurality of apertures 67. A turbine 50 is provided having an inlet 52, an outlet 54 and a rotatable member 56 disposed in a flow path between inlet 52 and outlet 54. Inlet 52 of turbine 50 is connected via conduit 31 to outlet 30 of combustion chamber 22. Inlet 34 of compressor 32 is coupled via conduit 33 with outlet 54 of turbine 50, whereby steam from outlet 54 of turbine 50 is recycled as will hereinafter be further described. Compressor 32 has a plurality of water injector nozzles 58 adapted for connection to a water source (not shown) via water supply conduit 62. Referring to FIGS. 8 and 9, it is preferred that an axial flow compressor be used having an outer housing 64 with a plurality of stationary blades 66 and a rotor 68 with plurality of rotating blades 70. FIGS. 6 and 7 illustrate alternative placements for water injectors 58 relative to stationary blades 66. Referring to FIGS. 8 and 9, the water injection system in compressor 32 includes a manifold 72 connected by liquid tubes 74 to water injector nozzles 58. Compressor 32 has a shaft 78 which is connected by a shaft extension 80 to a shaft 82 of turbine 50. A secondary conduit 84 is connected to conduit 38. Secondary conduit 84 has a valve 86 which may be wholly or partially closed depending upon conditions of operation. Secondary conduit is intended to be a means of pressure control by bleeding off excess working fluid; preferably at the point of lowest enthalpy.

The use and operation of hydrogen fuelled gas turbine 20 will now be described with reference to FIGS. 1, and 5 through 9. Referring to FIG. 1, hydrogen from hydrogen storage tank 42 and oxygen from oxygen storage tank 46 are supplied via conduits 40 and 44, respectively, to hydrogen inlet 28 and oxygen inlet 26 of combustion chamber 22. Steam from compressor 32 is supplied via conduit 38 to steam inlet 24 of combustion chamber 22. Referring to FIG. 5, steam flows through steam inlet 24 through combustion chamber 22 to outlet 30. The flow path of the steam is generally established by the positioning of inner housing 65, with a portion of the steam passing through apertures 67 into the area in which igniter 48 is positioned. A hydrogen/oxygen mixture passes into combustion chamber 22 adjacent igniter 48 after first mixing in mixing chamber 63. Igniter 48 provides a spark to explosively ignite the mixture. Upon explosive ignition the products of combustion combine with the steam and rapidly expand out through outlet 30 of combustion chamber 22. Referring to FIG. 1, the rapidly expanding steam that passes through outlet 30 along conduit 31 to inlet 52 of turbine 50. The steam passes from inlet 52 of turbine 50 to outlet 54. When passing through turbine 50 the expanding steam exerts a force to rotate the rotatable member 56. Steam exiting through outlet 54 of turbine 50 is recycled via conduit 33 to inlet 34 of compressor 32. Any steam in excess of that required for recycling through compressor 32 is vented to atmosphere via secondary conduit 84. The flow through secondary conduit 84 is controlled by valve 86. Referring to FIGS. 6 through 9, steam passing into compressor 32 via inlet 34 is subject to a compressive force exerted by the interaction of stationary blades 66 and rotating blades 70. Water is injected into compressor 32 via water injector nozzles 58. Water is drawn from a source of pure water (not shown) via water supply conduit 62. When water is injected into the steam the water draws heat from the steam as it vaporizes. This triggers a physical reduction in the volume of the steam. This physical volume reduction is a radical contraction which turns an otherwise energy intensive procedure into one which theoretically is capable of producing work. Water injector nozzles 58 are arranged around the periphery of outer housing 64 of compressor 32 to provide a spray water between each stationary blade 66. Water injector nozzles 58 provide mechanical atomization of the water to the point that erosion is not encountered on contact with the rotating blades. Water for water injector nozzles 58 is substantially free of suspended or dissolved solids. The amount of water injected is controlled such that only sensible or superheat is removed for the corresponding stage pressure. This applies for every stage in the compressor. Compressor 32 is coupled to turbine 50 via shaft extension 80, to take advantage of any useful output. Compressed steam is conveyed from outlet 36 of compressor 32 via conduit 38 to steam inlet 24 of combustion chamber 22. With this embodiment, the majority of steam is "recycled".

Referring to FIG. 2, in this second embodiment secondary conduit 84 has been converted into a secondary steam recycling path rather than venting excess steam to atmosphere are was done in the first embodiment. Connected to secondary conduit 84 are a condenser 88 and a vented water storage tank 90. In addition water supply conduit 62 has been connected to water storage tank 90 and a pump 92 placed along water storage conduit 62. Water storage tank 90 has an excess supply conduit 94 and a vent to atmosphere 96. Excess supply conduit enables excess water resulting from the products of combustion to be removed.

Referring to FIG. 2, when the second embodiment is in use and operation steam passing along secondary conduit 84 is induced to condense in condenser 88 to form water which flows to water storage tank 90. Water storage tank 90 is vented so that any non-condensible vapours can vent to atmosphere. Water in water storage tank 90 is pure and as such is ideally suited for use with water injector nozzles 58. Pump 92 draws from water storage tank 90 sufficient pure water to supply, via water supply conduit 62 which feeds water injector nozzles 58. The water produced through secondary conduit 84 is greater than the water drawn by water supply conduit 62 to feed water injector nozzles 58 and the excess water can be drawn via conduit 94 and used for other useful purposes. In addition, a heat exchange occurs within condenser 88 during the process of condensing the steam. The heat exchanged can potentially be captured and used for a useful purpose.

Referring to FIG. 3, the third embodiment is a closed system in which the source of hydrogen and the source of oxygen is an electrolyzer 98. The power to run electrolyzer 98 is preferably supplied by a photo voltaic solar panel 99. Electrolyzer 98 has a water inlet 100, a hydrogen outlet 102 and an oxygen outlet 104. Water inlet 100 of electrolyzer 98 is coupled to water storage tank 90 via conduit 106. A pump 108 is provided on conduit 106 to move pure water through conduit 106 from water storage tank 90 to water inlet 100. Hydrogen outlet 102 is coupled via conduit 110 with hydrogen storage tank 42. Oxygen outlet 104 is coupled via conduit 112 with oxygen storage tank 46.

Referring to FIG. 3, when the third embodiment is in use and operation electrolyzer 98 is supplied with pure water via conduit 106 from water storage tank 90. The water is broken down in electrolyzer 98 into its constituent elements of hydrogen and oxygen. The hydrogen and oxygen is stored in hydrogen storage tank 42 and oxygen storage tank 46 for use as needed.

Referring to FIG. 4, the fourth embodiment has a heat exchanger 114 added along conduit 33. This fourth embodiment is used if there is concern that the steam entering inlet 34 of compressor 32 is "too hot". Whether the steam is "too hot" relates directly to the design limitations of compressor 32. The temperatures reached and the volume change occurring must not exceed the design specifications. When the fourth embodiment is in use and operation a portion of the heat is removed from the steam via heat exchanger 114 and used for other useful purposes. Care must be taken not to cool the steam "too much". The water injection into dry steam is intended to effect a volume reduction. This can only be accomplished at high temperatures where the water draws heat from the steam as the water vaporizes. If the steam is cool, the pressure in the compressor can actually cause the steam to expand. It is important, therefore, that only the super heat be removed, as the decrease in volume is critical.

Figure 11:
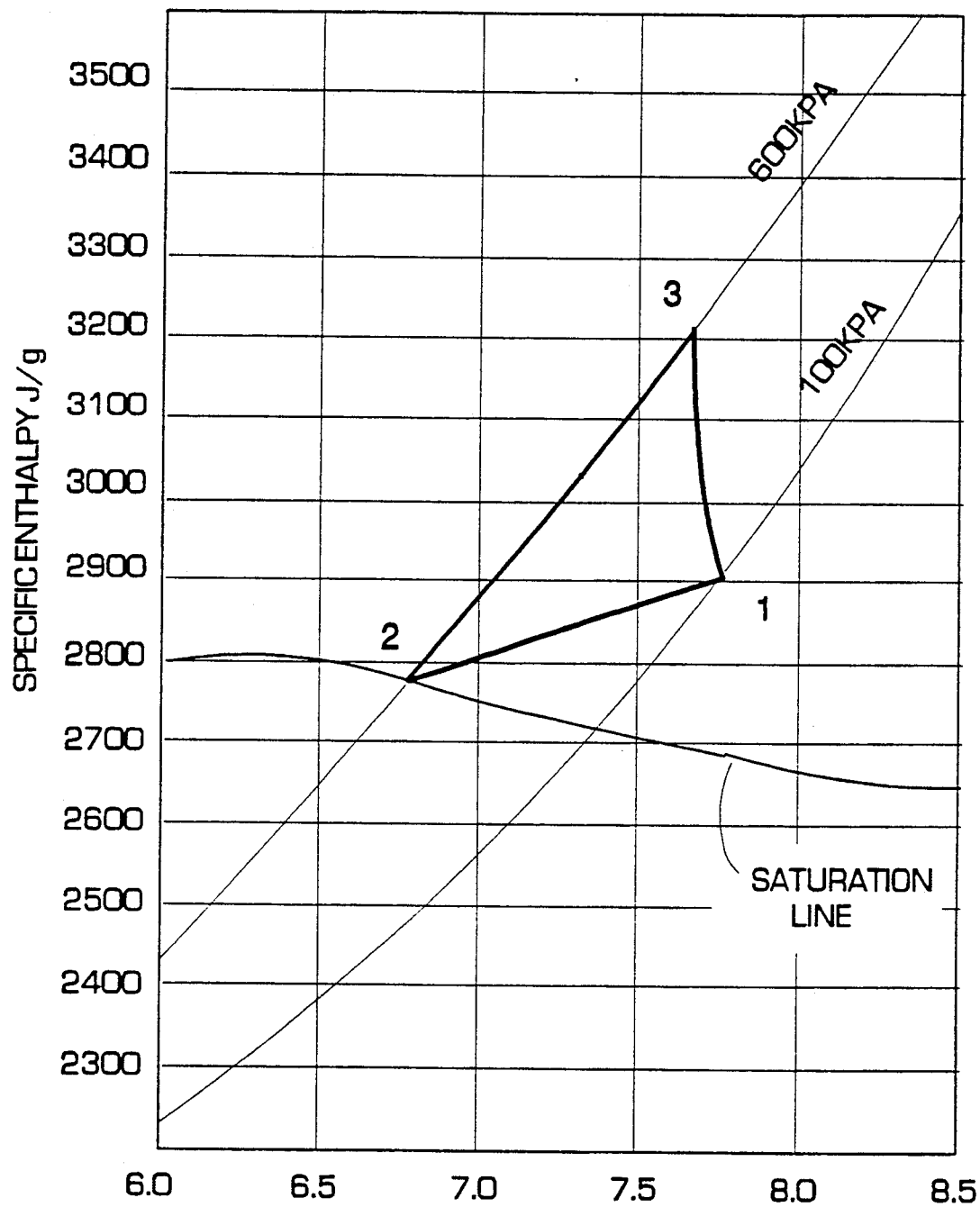
FIG. 11 is an Enthalpy - Entropy diagram for the embodiments illustrated in FIGS. 1 through 3.
Figure 12:
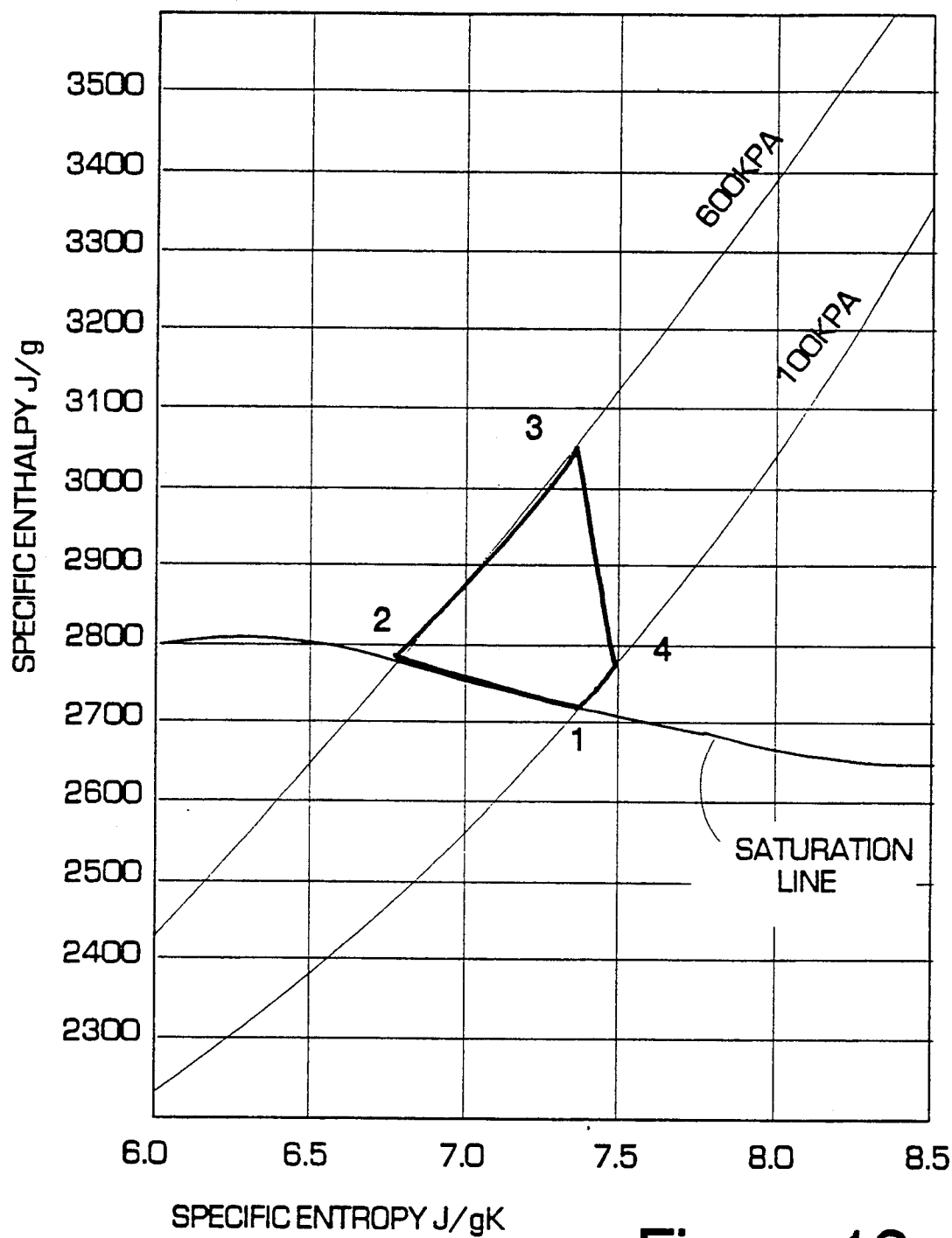
FIG. 12 is an Enthalpy - Entropy diagram for the fourth embodiment illustrated in FIG. 4.

Hydrogen fuelled gas turbine 20 has an improved thermodynamic heat cycle, as illustrated in FIGS. 10 through 12. Continuously recycling the steam as described, which serves as the working fluid, affects the thermodynamic heat cycle. An "ideal" thermodynamic heat cycle for the embodiment illustrated in FIG. 4 is illustrated in FIG. 10. It should be noted that the embodiments illustrated in FIGS. 1 through 3, depart from this form of model as points 1 and 4 become merged. Steam due to its lower molecular weight, (18 g/mol vs approx 29 g/mol for air) and higher temperature, requires more stages to obtain the same pressure ratio in a compressor when compared to air. This provides, however, an advantage for the removal of heat during compression as more time and space are provided for the heat exchange. As a result of one of the properties of water vapour, the volume of working fluid including that produced by vaporizing the injected water at a specific stage, will be less than if compression was allowed to be adiabatic. This is due entirely to the resulting lower temperature produced by the vaporization of the injected water. The amount of water injected is controlled such that only sensible or superheat is removed for the corresponding stage pressure. In the embodiments illustrated in FIGS. 1 through 3, the superheat in the working fluid is uniformly removed through out the compressor, as illustrated by Stage 1 to 2 in FIG. 11. In the fourth embodiment illustrated in FIG. 4, the superheat is removed prior to recycling steam through compressor 32 by heat exchanger 114 on conduit 33. The difference this makes to the thermodynamic cycle is illustrated in FIG. 12.

Referring to FIG. 10 the four stages of the ideal thermodynamic cycle are as follows:

Stage 1 to 2—polytropic compression. heat is removed from the working fluid during compression.

Stage 2 to 3—heat addition at constant pressure.

Stage 3 to 4—isentropic expansion of the working fluid from the highest pressure and temperature limits to the lowest pressure limit of the cycle.

Stage 4 to 1—heat is rejected at constant pressure.

In this Ideal heat cycle, the majority of the volume reduction of the working fluid will take place in the compressor, (stage 1 to 2), as opposed to the Brayton cycle where the majority takes place in stage 4 to 1. At maximum thermal efficiency, the values of points one and four will be the same. One major benefit of the polytropic compression in this cycle is a much reduced power requirement to operate the compressor, this makes the high energy efficiency possible In the example illustrated in FIG. 11 when the specific enthalpy of point #1 exceeds that of point #2, the compressor will also begin to produce useful work output. The net power output is calculated similar to an air based cycle that being the net difference in enthalpy between the turbine and the compressor. On FIGS. 11 and 12, that is $(H3-H4)-(H2-H1)$, note in FIG. 11 $H4=H1$. As with the Air Standard Cycle Efficiency, the Ideal thermal efficiency of the proposed cycle is:

$$\frac{\text{heat energy converted to work}}{\text{heat energy supplied}}$$

This is represented by:

$$\frac{(H3 - H4) - (H2 - H1)}{(H3 - H2)} \times 100$$

H = Specific Enthalpy (J/g)

Using hydrogen as a fuel, the products of combustion are compatible with the cycle fluid. As a consequence of water vapour entering the cycle in the compressor and combustion products entering the cycle in the combustion chamber, a continuous bleed off is provided through secondary conduit 84 to keep the cycle pressures constant. This bleed off is condensed using condenser/heat exchanger 88 which may use a gas or a liquid as the heat exchange mediums, with the condensed water preferably being reused for compressor coolant and for fuel production in the electrolyser. The condensed water will substantially equal the amount of fuel and compressor coolant used, so will form a continuous loop resulting in no continuous water make-up supply being required. An advantage of using steam is, in the superheated form at constant pressure, its specific heat is more than double that of air, consequently it has a higher work capability for the same mass of working fluid. A significant advantage of this improved cycle over the Rankine cycle is the latent heat contained in the Turbine exhaust does not have to be removed in order for the working fluid to be recycled. To obtain maximum thermal efficiency, the combustion chamber outlet temperature is to be controlled such that the turbine outlet temperature will approach the compressor design inlet temperature (constant entropy). As illustrated in FIGS. 11 and 12, this is where points 1 and 4 would become the same values. At this point the maximum heat energy added to the combustion chamber will be converted to useable work in the turbine. Operating the combustion chamber outlet temperature above this temperature will increase the turbine net power output but at a reduced thermal efficiency due to the extra sensible heat removal required in a turbine exhaust heat exchanger. As illustrated in the examples on FIGS. 11 and 12, it is preferred that the working fluid operate in the superheated region throughout the cycle. Depending on the mechanical limits of the compressor, some migration into the "Wet Steam" zone may be tolerated. It is also preferred that the lowest pressure in the cycle remain above atmospheric pressure. With the minimum cycle temperature being substantially above the ambient air temperature, the cycle and compressor cooling can be controlled such that the turbine output will be independent of the ambient air temperature. This is another important advantage over air based units.

It will be apparent to one skilled in the art that modifications may be made to the illustrated embodiments without departing from the spirit and scope of the invention as defined by the claims.

The embodiments of the invention in which an exclusive property or privilege is claimed are defined as follow:

1. A hydrogen fuelled gas turbine, comprising:
   a. a combustion cheer having a steam inlet, an oxygen inlet, a hydrogen inlet, and an outlet;
   b. a compressor;
   c. means for connecting the steam inlet to the compressor such that the compressor provides steam as a working fluid;
   d. means for connecting the hydrogen inlet to a source of hydrogen gas, whereby hydrogen gas serves as a fuel for combustion;
   e. means for connecting the oxygen inlet to a source of oxygen gas, whereby oxygen is supplied to oxidize the hydrogen fuel;
   f. an igniter disposed within the combustion chamber whereby the hydrogen/oxygen mixture is explosively ignited, the products of combustion combining with the steam and rapidly expanding out through the outlet of the combustion chamber;
   g. a turbine having an inlet, an outlet and a rotatable member disposed in a flow path between the inlet and the outlet, the inlet of the turbine being connected to the outlet of the combustion cheer such that expanding steam exerts a force to rotate the rotatable member when passing from the inlet to the outlet;
   h. the compressor having an inlet coupled with the outlet of the turbine whereby steam from the outlet of the turbine is recycled, the compressor having a plurality of water injectors adapted for connection to a water source whereby water is injected into the steam such that the water draws heat from the steam thereby triggering a physical volume reduction; and
   i. pressure control means.

2. The hydrogen fuelled gas turbine as defined in claim 1, the pressure control means being a secondary conduit for removing excess working fluid.

3. The hydrogen fuelled gas turbine as defined in claim 1, having a secondary steam recycling path passing through a condenser and terminating in a vented water storage tank, such that the steam induced to condense in the condenser to form water which flows to the water storage tank.

4. The hydrogen fuelled gas turbine as defined in claim 3, the water storage tank serving as the water source for the water injectors of the compressor.

5. The hydrogen fuelled gas turbine as defined in claim 1, the compressor being an axial flow compressor.

6. The hydrogen fuelled gas turbine as defined in claim 5, the axial flow compressor being coupled with an output shaft of the turbine such that the power to drive the axial flow compressor is derived from the turbine.

7. The hydrogen fuelled gas turbine as defined in claim 1, the compressor being an axial flow compressor configured to produce useful work, the axial flow compressor being coupled with an output shaft of the turbine such that the combined useful work produced by the axial flow compressor and the turbine is transmitted to the output shaft.

8. The hydrogen fuelled gas turbine as defined in claim 3, the source of hydrogen and the source of oxygen being an electrolyzer, the electrolyzer being coupled to the water storage tank such that water from the water storage tank is passed through the electrolyzer and broken down into its constituent elements of hydrogen and oxygen.

9. The hydrogen fuelled gas turbine as defined in claim 8, the power for the electrolyzer being supplied by a photovoltaic solar panel.

10. A hydrogen fuelled gas turbine, comprising:
    a. a combustion chamber having a steam inlet, an oxygen inlet, a hydrogen inlet, and an outlet;
    b. a compressor;

c. conduit connecting the steam inlet to the compressor such that the compressor provides steam as a working fluid;
d. an electrolyzer having a water inlet, a hydrogen outlet and an oxygen outlet;
e. a hydrogen gas storage tank coupled with the hydrogen outlet of the electrolyzer;
f. an oxygen gas storage tank coupled with the oxygen outlet of the electrolyzer;
g. conduit connecting the hydrogen inlet of the combustion chamber to the hydrogen storage tank, whereby hydrogen gas is drawn from the hydrogen storage tank as a fuel for combustion;
h. conduit connecting the oxygen inlet to the oxygen storage tank, whereby oxygen gas is drawn from the oxygen storage tank to oxidize the hydrogen fuel;
i. an igniter disposed within the combustion chamber whereby the hydrogen/oxygen mixture is explosively ignited, the products of combustion combining with the steam and rapidly expanding out through the outlet of the combustion chamber;
j. a turbine having an inlet, an outlet and a rotatable member disposed in a flow path between the inlet and the outlet, the inlet of the turbine being connected to the outlet of the combustion chamber such that expanding steam exerts a force to rotate the rotatable member when passing from the inlet to the outlet;
k. the compressor having an inlet coupled with the outlet of the turbine whereby steam from the outlet of the turbine is recycled, the compressor having a plurality of water injectors adapted for connection to a water source whereby water is injected into the steam such that the water draws heat from the steam thereby triggering a physical volume reduction; and
l. a condenser disposed in a secondary steam/pressure control circuit terminating in a vented water storage tank, the secondary steam circuit being coupled with the outlet of the turbine such that the steam is induced to condense in the condenser to form water which flows to the water storage tank, the water storage tank serving as the water source for the water injectors, the water inlet of the electrolyzer being coupled to the water storage tank such that water from the water storage tank is passed through the electrolyzer and broken down into its constituent elements of hydrogen and oxygen.

* * * * *